United States Patent [19]

Weber

[11] Patent Number: 4,878,010
[45] Date of Patent: Oct. 31, 1989

[54] ELECTRIC A.C POWER SWITCH CONTROLLER AND D.C. POWER SUPPLY METHOD AND APPARATUS

[76] Inventor: Harold J. Weber, 20 Whitney Dr., Sherborn, Mass. 01770

[21] Appl. No.: 131,096

[22] Filed: Dec. 10, 1987

[51] Int. Cl.$^4$ .................................................. G05F 5/00
[52] U.S. Cl. ........................................ 323/300; 323/324
[58] Field of Search ............... 323/237, 239, 241, 300, 323/322, 323, 324, 325

[56] References Cited

U.S. PATENT DOCUMENTS

| 3,499,168 | 3/1970 | Dinger | 323/300 X |
| 3,940,660 | 2/1976 | Edwards | 307/141 X |
| 4,253,045 | 2/1981 | Weber | 315/210 |
| 4,270,058 | 5/1981 | Schornack | 307/140 |
| 4,300,090 | 11/1981 | Weber | 323/311 |
| 4,336,464 | 6/1982 | Weber | 307/141.4 |
| 4,438,501 | 3/1984 | Weber | 364/717 |

FOREIGN PATENT DOCUMENTS

0047129  4/1981  Japan .................................... 323/324

Primary Examiner—Patrick R. Salce
Assistant Examiner—Kristine Peckman

[57] ABSTRACT

A.c. line operated controller which provides solid-state switching of a.c. power flow, together with producing a supplementary source of low d.c. power for operation ancillary circuits. Operation is obtained through electrical connection that is in series with only one side of the a.c. power circuit. Device utilizes a thyristor for a.c. power switch control. A small residual potential which is devised to appear across the ON-state thyristor is rectified to produce the low d.c. power level. When the thyristor is OFF, the line voltage potential across the thyristor is reduced and rectified to produce the low d.c. power level. Turning the thyristor OFF is attained by current starving of the thyristor gate electrode by a gate shunting semiconductor switch. Device is shown to be utilized in "two terminal" apparatus producing time delayed switching of a light, as a controller for producing the illusion of a flickering flame from an ordinary light bulb, as a light flasher, and as a "touch-controlled" a.c. power switch for lighting.

20 Claims, 10 Drawing Sheets

ELECTRIC A.C POWER SWITCH CONTROLLER AND D.C. POWER SUPPLY METHOD AND APPARATUS

BACKGROUND OF INVENTION

The connection of a.c. power controllers with the wiring of buildings, and for similar purposes, is frequently obtainable only with one side of the a.c. power line. For example, the looping of a wall switch circuit from a ceiling light or the like is very often done with a two-conductor "Romex" cable: e.g., only the "black" (hot) side of the a.c. circuit is interrupted somewhere between the a.c. source and the light fixture. Full line power is therefore not actually brought to the wall switch location. The whole arrangement takes on the schematic equivalence of a series circuit.

As a result of this common style of wiring practice, it is necessary that any electrical device intended to find popular acceptance as a replacement for, or supplement to, the function of the ubiquitous wall switch must rely upon merely the power present in the one side of the circuit. Such a device must be series circuit connectable, depending solely upon current flow through one side of the circuit as the primary source of any operating potentials.

In my earlier U.S. Pat. No. 4,300,090 I provided a "Direct Current Power Supply" operable from merely one side of an a.c. power circuit. Operation was obtained from the current flow through a thyristor, which was further devised to have its turn-ON during at least on one-half of each a.c. power cycle slightly retarded, whereby the small pre-conduction potential which then developed across the thyristor was rectified and utilized as a source of low-voltage direct current having good stability with few parts.

In my subsequent U.S. Pat. No. 4,336,464 I addressed the operation of a "Two Terminal Timed Electric Switch" which adapted my earlier power supply patent to that of satisfying the need for an a.c. timed wall switch or the like which obtains all of its operating potentials from merely one side of the a.c. line.

I have now recognized that further improvement can be obtained by providing apparatus which, together with the method for operating that apparatus, obtains full ON and OFF operation of the a.c. power line and produces a low-voltage source of direct current power from but one side of the a.c. line. I also now reveal how such operation may be obtained using few and inexpensive parts in a non-critical hookup arrangement which lends itself to low cost mass production.

The capability for coming forth with a relatively stable source of low voltage d.c. power from the series a.c. power circuit hookups taugt in my earlier -090 patent does not provide any obvious arrangement for turning the a.c. power flow ON and OFF, aside from that of a separate mechanical switch or the like.

The turning ON and OFF of the a.c. power flow by the circuit taught in my -464 patent is also silent regarding the obtaining of necessitous switching action integral with the d.c. power supply portion of the circuit: e.g., as separate switch and power supply control thyristor device is shown.

In view of my earlier art forms, I realized that it would be advantageous in both the sense of circuit economy, as well as mere eloquence, to obtain ON and OFF switching of the a.c. power with subsantially the same parts of a device's circuitry which produces the d.c. power for its operation. Aside from being cheaper and simpler to build, fewer parts also may mean less potential for premature failure. Some savings in size, and less power dissipation also benefits from such functional consolidation.

SUMMARY

Full ON and OFF switching of a.c. power, together with the providing of a source of low-voltage d.c. power, is the fundamental operational result provided by my instant invention. Such operation is furthermore obtained by interconnection with merely one side of the a.c. circuit: e.g., so-called "two terminal" operation.

In old, as well as new, construction for dwellings and other buildings it is common and nearly universal practice to run merely two power carrying wires to wall switches. The two wires are then typically connected in series with the a.c. circuit that exists between a load such as a light fixture, and a source for the a.c. power (such as a fuse box). In the past, the elemental practice for such circuits was to install a form 1 (s.p.s.t.) toggle switch in the circuit, which the user would flip ON or OFF thereby turning the load ON and OFF.

With the advent of more sophisticated control devices, operation from merely one side of the a.c. power line is stil needed, together with the producing of a source of low voltage d.c. to operate any electronic circuitry so commonly used in such contemporary control devices. It has therefore become necessary to develop d.c. voltage from whatever electricity may appear "across" the controller terminals. In the OFF state about full a.c. line voltage appears across the usual controller hookup, and it is no big deal to rob a small portion of this electrical value by way of a high value resistor and rectifier diode to produce the charging of a capacitor and thereby give a source of relatively low-voltage d.c. potential, albeit of limited current capability. So long as the current needs are on the order of a few milliamperes or less, this approach is entirely adequate. However, this arrangement meant that, when the controller was "ON", negligible "voltage" might be available across the controller with the result that d.c. power would be lost. I then taught in my U.S. Pat. No. 4,300,090 how a smallish value of a.c. potential can obtained by current flow through the turned-ON a.c. circuit which is rectified and serves to continue to provide low voltage d.c. power needs even when the circuit is ON.

Several manufacturers of control devices have used the power supply method based on my U.S. Pat. No. 4,300,090 to obtain ON state d.c. power for operation of their attendant circuits. In particular, these devices are "wall switch" type timers. One device, the Model EI15MH made by Intermatic Inc., Spring Grove, Ill. utilizes a TRIAC having a zener diode effectively coupled between the MT-2 and GATE terminals thereof by way of a semiconductor switch when in the ON state. Thus, the zener diode retards turn-ON conduction of the TRIAC like that taught for the earlier patent, giving rise to a smallish a.c. potential across the TRIAC which is rectified to provide the d.c. power needed to operate a Motorola MC-14541B timer integrated circuit. In this product, the "high voltage" side of the TRIAC (MT-2 side) is that which is being switched, meaning that a relatively more expensive and less reliable (regarding power line spikes and the like) small semiconductor switch device has to be hooked between the zener diode and the MT-2 terminal of the TRIAC. The result is a sort of "brute force" adaptation of my earlier patent's power supply circuit to that of providing ON and OFF operation of the attendant circuit by a common thyristor.

Another timing device which obtains d.c. power for timing circuit operation by using a power supply circuit like that of my earlier -090 patent is produced by Paragon Electric Company, Two Rivers, Wis. as their model ET-600. In this device, d.c. power in the ON state for the timer is developed by retarding the turn-ON of a TRIAC by having a zener diode hooked in series with a 51 ohm resistor and a Motorola MC-3030 optocoupler between the MT-2 terminal and the gate of the TRIAC. Thus the MT-2 terminal voltage (relative with terminal MT-1) has to exceed the zener voltage before TRIAC turn-ON can occur: the result being a smallish a.c. voltage across the terminals which is rectified and used to charge a capacitor thereby providing a low voltage d.c. level for the operation of an RCA CD-4541B integrated circuit timer. Turn-OF and turn-ON of the switch function of the thyristor is attained by controlling the optocoupler and thus either connecting or diconnecting gate connection (by way of the zener diode) with the thyristor MT-2 terminal. As a result of this hookup, d.c. power is produced by using the fundamental essence of my earlier patent teachings when in the ON state; however ON and OFF control is obtained only at considerable expense through the use of a relatively costly optocoupler and attendant drive circuitry.

What I now teach is a cheaply implemented method for obtaining ON and OFF a.c. power control from few more components that what essential for the practice of the d.c. power supply portion of my earlier -090 patent. In fact, the most basic implementation of my present teaching requires merely one inexpensive, low voltage NPN transistor and a current limiting resistor beyond that of the circuitry previously taught by FIG. 1 of my earlier -090 patent. You will quickly realize that this approach is much more economical than that of having optoisolators, high voltage transistors, or other more exotic devices to achieve switching control.

You will find that an object for may invention is that of producing ON and OFF thyristor controlled switching of an a.c. load that is connected serially through the controller with a source of a.c. power, while at the same time producing a source of low voltage d.c. power rectified from a voltage drop which is devised to appear across the thyristor.

Another object is to produce the low voltage d.c. power from the relatively high a.c.voltage present across the thyristor when it is in the OFF state, and clamping that d.c. voltage to a nearly constant value by a zener diode or the like.

Still another object is to continue to produce the low voltage d.c. power from a predetermined level of relatively low a.c. voltage established across the thyristor when it is in the ON state, whereby the value of the d.c. voltage and the magnitude of the peak a.c. voltage level are each substantially determined by the clamping action of a breakdown diode.

Yet another object for my invention is to produce economic switching of a.c. power fed to a load having serial interconnection with but one side of the electric circuit, while also producing a source of low voltage d.c. power from the same connection when the switch is in either the ON or the OFF state.

Intended also is the showing of how my invention materially contributes to the implementation of an economically advantageous product providing timed operation of an electric wall switch.

Furthermore I show how a flickering flame illusion lighting effect may be produced from an ordinary incandescent light bulb, utilizing an electric controller which connects serially with but one side of the electric circuit.

A still further object for my invention is to provide "flashing" light control of an electric light bulb, with an electronic controller having serial connection with but one side of the electric circuit.

Yet a further object for my invention is to show how a "touch" activated electronic wall switch may be constructed using the essence of this invention, whereby operation necessitates merely two terminal serial connection with one side of the a.c. power circuit thus enabling ready replacement of ordinary mechanical wall switches.

These and other objects for, and novel applications involving the fundamental teachings of my invention will be revealed to the astute artisan through the study of my invention's description, together with the attendant drawing figures.

DESCRIPTION OF DRAWINGS

My invention is shown on 10 sheets of drawings having 16 figures.

DESCRIPTION OF MY INVENTION

Figure 1:
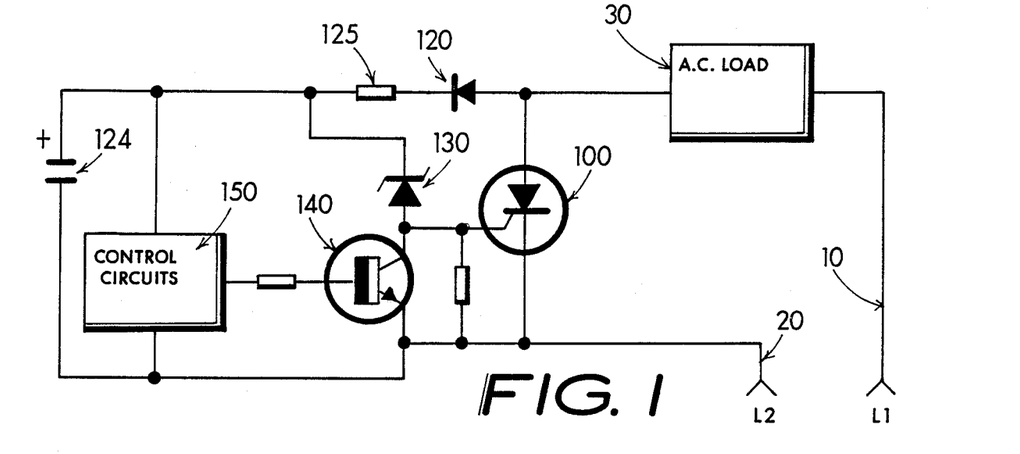
FIG. 1 Half wave a.c. power ON/OFF control and d.c. power supply.

Half-wave switching of a.c. power to a load is provided by the hookup shown in FIG. 1. One side 10 of the a.c. power line connects with the load 30, while the other side 20 connects with the cathode of a silicon controlled rectifier (s.c.r.) 100. The s.c.r. anode couples with the other side of the load 30. A rectifier 120 couples through resistor 125 with the cathode of a zener diode 130. Breakdown of the zener diode occurs when the rectified d.c. voltage developed across capacitor 124 exceeds the zener avalanche value, whereupon current flows through the gate of the s.c.r. 100, which connects with the zener diode 130 anode. The result is that the s.c.r. turns-ON whenever the s.c.r. anode-to-cathode voltage exceeds the zener diode breakdown value, and furthermore that the pre-breakdown voltage is of sufficient magnitude to allow for reliable development of the d.c. voltage across the capacitor 124. The load 30 is thus turned ON.

The d.c. voltage developed across the capacitor 124 is typically used to provide operating power for some sort of control circuit 150 which perform a function, such as that of a timer. When the control circuit produces a HIGH level as coupled with the base of NPN transistor 141, the collector-to-emitter portion of the transistor saturates, thereby shunting the current flow from the zener diode away from the s.c.r. gate: the gate is thus immediately starved for current and the s.c.r. remains OFF (subsequent to half-cycle commutation). Operation is faithful in that the saturation voltage for the transistor is typically less than about +0.5 volts, whilst the threshold gate voltage for the s.c.r. is more than about +0.8 volts. The fundamental result is that the s.c.r. is ON, and the a.c. load is operative whenever the transistor 141 is OFF, and conversely the s.c.r. is held OFF, and the a.c. load is de-energized whenever the transistor 141 is ON. Noteworthy also is that when the transistor 141 is ON, the zener diode 130 continues to shunt-regulate the d.c. voltage by increased voltage drop across the resistor 125. In practical application, an artisan may tinker with my circuit by utilizing a value between about 6,800 and 22,000 ohms for resistor 125, while the zener diode may be typified by a 1N4742A. The s.c.r. can be a Teccor Electronics Inc. type T106B1, while the transistor 140 may be a 2N5172. A 1N4004 is a suitable diode 120, and the capacitor 124 may be 50 uF. Under such condition, about +12 to +13 d.c volts develops across the capacitor 124 during both the ON and OFF states of the s.c.r. 100.

Figure 2:
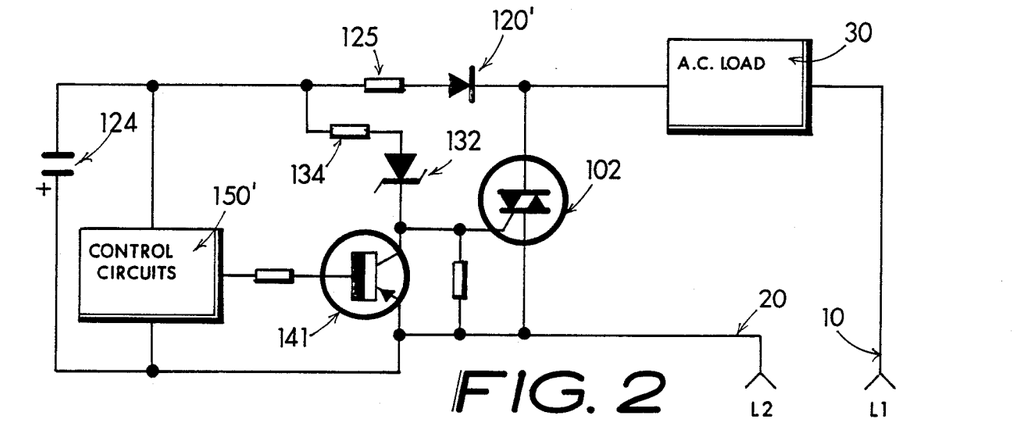
FIG. 2 Full-wave a.c. power ON/OFF control and negative d.c. power supply.

Full wave switch control of the load is provided by a so-called "sensitive gate" triac 102 in FIG. 2. The rectifier diode 120' and resistor 125' act in concert to couple the negative voltage which develops across the triac through a resistor 134 with a zener diode 132. When the developed negative is of sufficient magnitude to induce avalanche breakdown of the zener, triac gate current will flow and the triac will be turned ON, thereby energizing the load 30. The presence of resistor 134 allows for the capacitor 124' to be charged to a somewhat higher value than what would occur if the zener were merely coupled with the resistor 125' directly. Through judicious selection of the values for the resistor 134 and capacitor 124', sufficient voltage remains across the capacitor during the positive a.c. power half-cycle (as appearing across the triac) to bring forth a capacitor 124' discharge path current flow through the resistor 134, the zener 132 and the gate of the triac 102 to maintain the triac in the ON state. It should be recalled that this merely means the current flow has to overlap into the positive half-cycle period: once conduction is initiated in the triac, it continues anyhow. Also it should be acknowledged that ordinary triac devices "fire" with either positive or negative gate current flow.

The control circuits 150' may produce an essentially nil current flow for the base of the transistor 141 when the controller triac is deemed to be ON, whilst a negative current flow is produced when an OFF state is desired. The negative current flow into the PNP transistor base brings about ON-state saturation of the collector, resulting in the shunting of current flow developed by the zener 132 away from the triac gate. The triac is thus starved for gate current, and subsequent to zero-crossover commutation it remains OFF. In the OFF state essentially full a.c. line potential will appear across the triac, with the result that the negative voltage rectified by the diode 120' must be dropped by the resistor 125' to a reasonable value to sustain the charge across the capacitor 124'. The voltage drop is largely maintained near its proper value by the breakdown current flow obtained through the zener diode 132 as coupled to the "ground" (common) side 20 of the circuit through the saturated collector to emitter junction of the transistor 141. The value of resistor 125' is typically much larger than that of resistor 134, therefore only a small increase in the developed d.c. voltage occurs whenever the triac is OFF.

Figure 3:
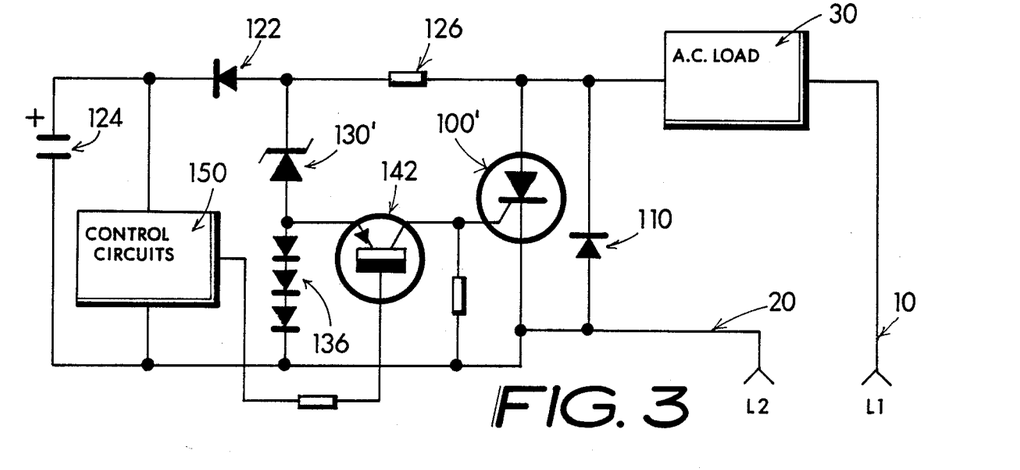
FIG. 3 Full-wave 50% a.c. power HIGH/LOW control and d.c. power supply utilizing PNP transistor device.

The alternate switching of the a.c. load 30 power between full-on and part-on is obtained in the circuit of FIG. 3. An s.c.r. 100' serves as the switch element whicg is shunted by a power diode 110. The result is that, even when the s.c.r. is OFF, half-wave current flow through the a.c. load continues. Such an arrangement might be useful for bright/dim control of a light, or fast/slow operation of a universal motor. In this hookup, the zener diode 130' is connected ahead of the rectifier diode 122 with the result that the positive a.c. pulses allowed across the OFF-state s.c.r. couple through resistor 126 with the zener diode 130', and to the return side 20 of the circuit through the several diodes 136. When the control circuit 150 produces a LOW level output, current flow is induced through the common-base amplifier connection of the transistor 142 which brings about current flow into the gate of the s.c.r. 100', resulting in its turn-ON. In this mode, it must be realized that the collector-to-emitter portion of the transistor 142 is saturated, resulting in about 0.5 volt drop thereacross. Additionally, the usual sensitive-gate s.c.r. such as the aforementioned Teccor T106B1 presents about a +0.8 volt gate junction drop: thus, the combined drop across the several diodes 136 must exceed about +1.3 volts. Three diodes, as shown, can satisfy this with a combined drop of about +2.1 volts. When the control circuit 150 produces a HIGH level output, the transistor 142 will be cut-OFF, resulting in no current flow for the s.c.r. which will then remain OFF subsequent to negative half-cycle commutation. The rectifier 122 produces a low d.c. voltage across the capacitor 124 which is sustained in both the ON and OFF states of the s.c.r. by voltage drop across the resistor 126 as principally brought about by the zener diode 130' current path. When the s.c.r. is OFF, the d.c. voltage will rise about +0.8−+1.0 volt higher than when the s.c.r. is ON due to the added drop of voltage across the several diodes 136, relative with the lesser drop across the saturated transistor and s.c.r. gate. It shall be realized that the voltage developed at the juncture of the zener 130', resistor 126, and diode 122 never appears more than about −0.7 volt negative due to the clamping effect of the power diode 110.

Figure 4:
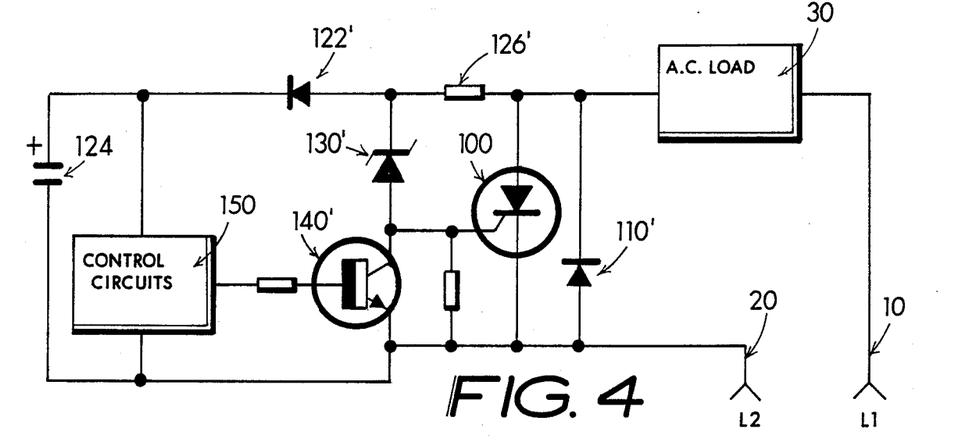
FIG. 4 Full-wave 50% a.c. power HIGH/LOW control and d.c. power supply.

The circuit of FIG. 4 differs from that of FIG. 3 primarily in that a NPN transistor is used for control. When the control circuits 150 produce a HIGH level output for the base of the NPN transistor 140', the transistor saturates-ON, resulting in diversion of the zener diode 130' induced current flow away from the s.c.r. 100 gate, and to the return side of the circuit 20. The result is that the s.c.r. is maintained non-conducting and only half-wave a.c. power will couple with the a.c. load 30 by way of power diode 110', which might be a 1N5394 for a.c. load current up to about 1.5 amperes. The diode 122' steers a portion of the positive potential developed across the zener diode to the capacitor 124, thus developing the desired low d.c. voltage thereacross.

Figure 5:
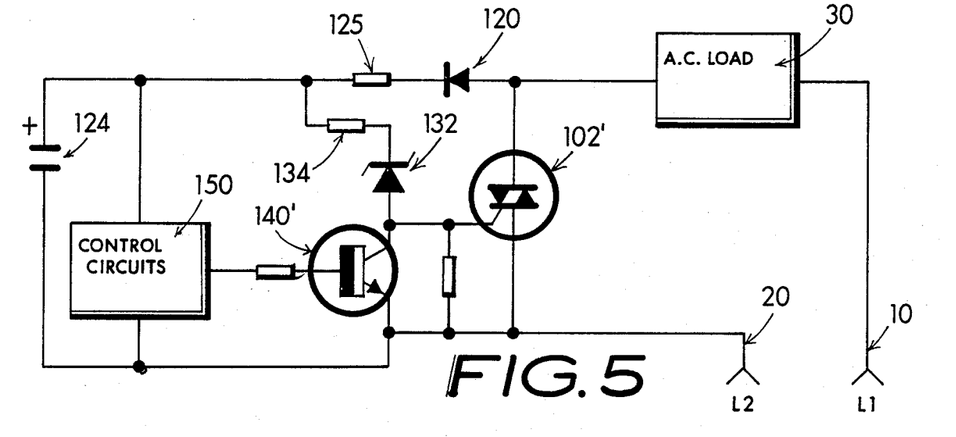
FIG. 5 Full-wave a.c. power ON/OFF control and positive d.c. power supply.

The circuit of FIG. 5 differs from that of FIG. 2 mainly through the use of a NPN transistor 140', and in the overall re-configuration of the circuit hookup to provide for the developing of a positive low-value d.c. voltage across the capacitor 124, relative with the common side of the circuit 20. Operation of the circuit is similar to that of FIG. 2, taking into account the difference in polarity signs. A positive HIGH signal from the control circuits 150 couples to the base of the NPN transistor 140' producing saturation and thus keeping the triac 102' OFF; conversely, a LOW signal from the controls 150 allows the transistor to turn-OFF, thereby allowing gate current flow for the triac by way of the zener diode 132', resulting in turn-ON of the tirac and a.c. load 30 enablement.

Figure 6:
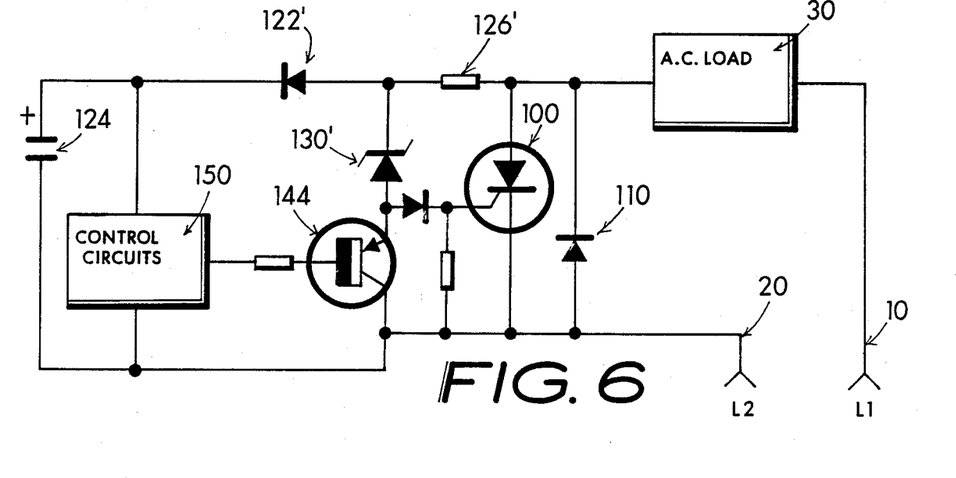
FIG. 6 Full-wave 50% a.c. power HIGH/LOW control and d.c. power supply utilizing PNP transistor device.

The main difference between the circuit of FIG. 6 and that of FIG. 4 resides in the use of a PNP transistor 144 which means that when the control circuits 150 output produces a HIGH level on the transistor base, the PNP transistor will be OFF, resulting in turn-ON of the s.c.r. 100 by virtue of gate current introduced through the zener diode 130' breakdwon. Conversely, a LOW output from the control circuits 150 brings about PNP trnsistor 144 saturation, thus shunting zener current through the transistor emitter-to-collector portion to the s.c.r. cathode, thus starving the gate for current and resulting in s.c.r. inhibition, thereby allowing only half-wave power flow to the a.c. load 30 through the power diode 110.

Figure 7:
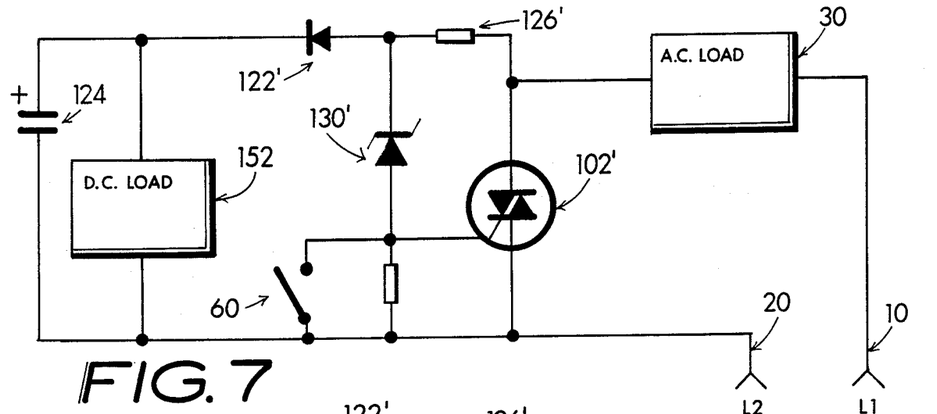
FIG. 7 Full-wave a.c. power ON/OFF control utilizing Form 1 switch contact control, together with d.c. power supply providing power for ancillary circuitry.

Full wave a.c. load 30 power control is afforded by the circuit of FIG. 7 through the triac 102'. The resistor 126' and zener diode 130' combine to serve to provide gate current for the triac 102', thus turning it ON. Current flow during the NEGATIVE a.c. power half-cycle couples to the gate directly through forward-conduction of the zener diode 130', whilst POSITIVE a.c. power half-cycle current is retarded somewhat by the intrinsic zener-voltage breakdown action of the zener diode before it couples to the gate of the triac. In effect, a succession of smallish positive a.c. component pulses appears across the thyristor 102' which is rectified by diode 122' to charge the capacitor 124, thereby providing a low d.c. voltage for operation of any ancillary circuits 152. A switch contact set 60 is connected between the triac gate and cathode. The contacts might (merely for example) be a portion of a reed-relay, such as a Magnecraft Electric Co. type W107DIP-3, and when they CLOSE, they rob gate current from the triac resulting in its turn-OFF. However, the a.c. component across the triac (albeit substantially higher) still flows through the resistor 126', and is shunted by the action of the zener diode to allow continued positive charging of the capacitor 124 through the rectifier diode 122'.

Figure 8:
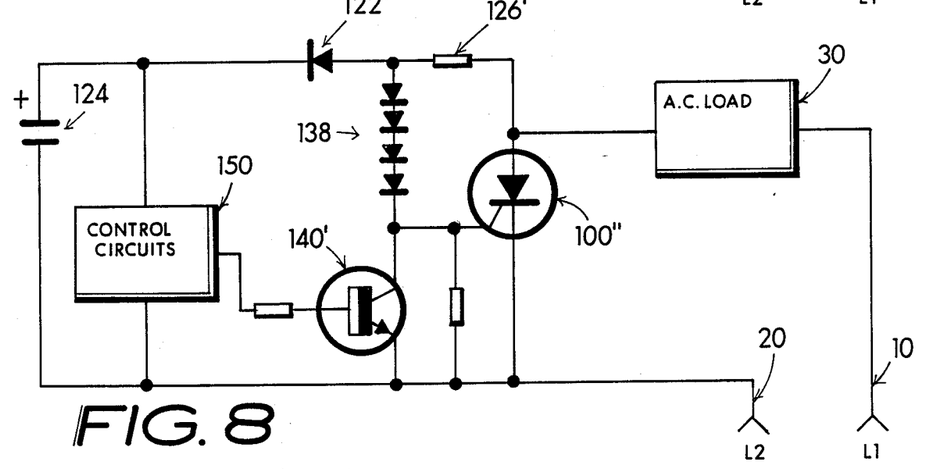
FIG. 8 Half-wave a.c. power ON/OFF control and d.c. power supply controlled by forward voltage drop of diode string.

A string of silicon diodes 138, such as 1N4148 which have a typical forward voltage drop of about 1.0 volt are used in lieu of a zener diode in the circuit of FIG. 8. The four shown diodes result in a combined drop of about +4.0 volts, which together with the +0.8 volt or so of gate drop, provide about +4.8 of a.c. component of the anode of the s.c.r. prior to turn-ON, which charges capacitor 124 to about +4.1 volts through rectifier 122'. Otherwise, the operation of transistor 140' and other circuit elements is like that of FIG. 4, except that merely half-wave a.c. load operation is provided in the absence of the power diode 110' shown in FIG. 4. The power diode may, of course, be included with FIG. 8 to produce essentially high/low operation of the load.

Figure 9:
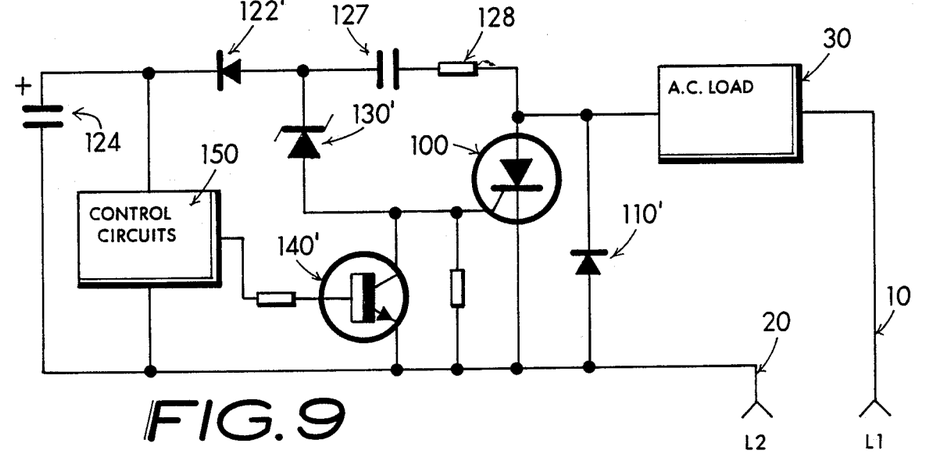
FIG. 9 Full-wave 50% a.c. power HIGH/LOW control using capacitor reactance as principal voltage dropping device.

The main elemental difference between FIG. 9 and the aforeshown figures resides in the utilization of an impeder 127 in the shown form of a capacitor to reduce the a.c. component across the thyristor 100, particularly when in the OFF state. It is well known that an a.c. impeder, in the form of a capacitor or inductor presents a reactance which may be likened to a.c. resistance in a non-complex circuit where substantially all of the other elements are resistive. Thus, for 60-hertz a.c. power, a capacitor value of 0.5 microfarads looks like about 5,300 ohms. However, in a practical sense very little power is dissipated across the capacitor which results in small circuit loss and heating. A resistor 128 is included, primarily to limit the peak current on any voltage spikes which might appear across the thyristor, as introduced from the a.c. power line, since the fast risetime of spikes brings about little drop across the capacitor because the reactance of the capacitor is inversely proportional to the effective frequency component (e.g., risetime) of the spike. Otherwise circuit operation is similar to that discussed relative with FIG. 4.

Figure 10:
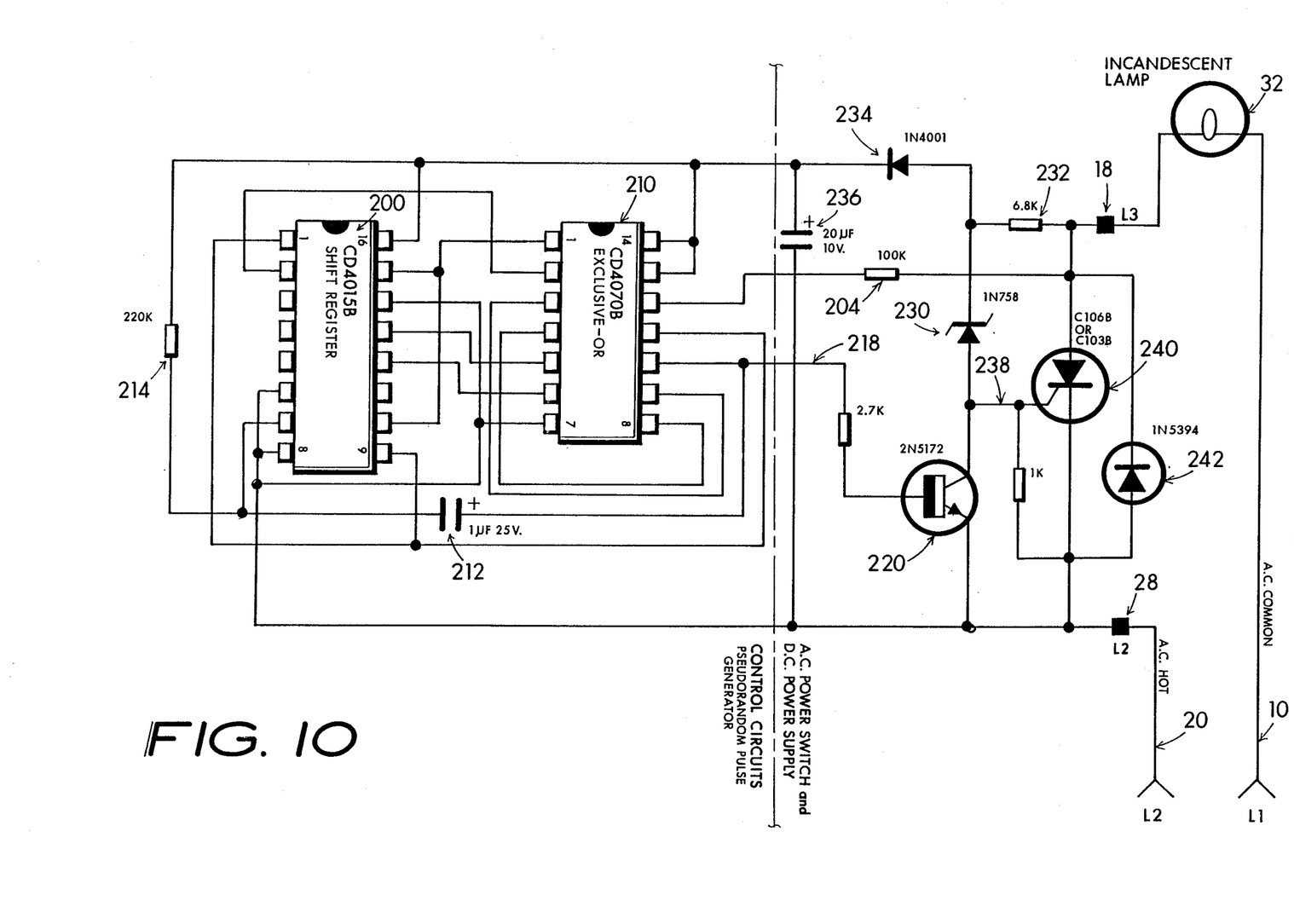
FIG. 10 Flickering electric light controller utilizing my invention whereby connection with only one side of the a.c. power line is needed.

An a.c. power controller which brings about the illusion of a flickering flame effect from an ordinary incandescent light bulb is shown in FIG. 10. In my previous U.S. Pat. No. 4,253,045 I show how the electrical flickering of the brightness level of a light bulb might be obtained by producing pseudorandom firing of a thyristor in synchronization with the a.c. power line frequency. However this earlier teaching lacks the ability for being operative with but one side of the a.c. power line. It must be coupled with the a.c. hot and common side to achieve satisfactory operation. In the practical sense, this means that it can only be mounted wherever both circuit lines are available. More importantly, one of the keynote shortfalls of the earlier device was the susceptibility for moisture penetration, particularly when used in outdoors locations. Due to the presence of full peak line voltage immediately inside the device (e.g., about 280 volts peak-to-peak), little insulation margin could be obtained in an economical package design. Therefore, it is desirous to operate the device from but one side of the line, whereby lesser voltage gradients appear inside the device: thus reducing the chance for unexpected breakdown due to moisture penetration with the result that the product's reliability is considerably enhanced. A shift register 200 is hooked-up as a pseudorandom binary signal source, in conjunction with portions of the quad-EXCLUSIVE-OR gate device 210. The capacitor 212 and resistor 214 provide anti-latchup operation, as I taught earlier in my U.S. Pat. No. 4,438,501. Clocking of the shift-register is provided as an a.c. pulse signal on line 202 through resistor 204 from the a.c. frequency component on the a.c. power line. A thyristor 240, such as the shown General Electric Company type C106B serves as the fast switch which can bring about irregular negative half-cycle power flow to the incandescent light bulb 32. A power diode 242 couples the positive half-cycle of the hot side of the a.c. power line directly to the light bulb, resulting in a rapid and erratic appearing modulation of the relative light produced by the light bulb between that of about 30–50% brightness and that of full brightness, depending on the state of the thyristor. A stream of irregular binary pulses couple 218 from the logic device 210 to the base of the NPN transistor 220, alternatively turning the transistor ON and OFF. The collector of the transistor couples with the thyristor gate current path 238, resulting in the irregular robbing of gate current from the thyristor by way of the ON-state saturated transistor 220. The result is ON and OFF modulation of the thyristor states in accord with the pseudorandom pulse train pattern produced by the shift-register 200. You will see that the actual control portion of the circuit, including the zener 230, the resistor 232, and the thyristor 240 is quite similar to that taught relative with FIG. 4. The low d.c. operating voltsge for the semiconductor devices is developed across capacitor 236 through the rectifier 234. You should most particularly note that merely two leads 18, 28 are now needed to obtain satisfactory flickering light control of the lamp 32. This is substantial improvement over the earlier mentioned U.S. patents.

Figure 11:
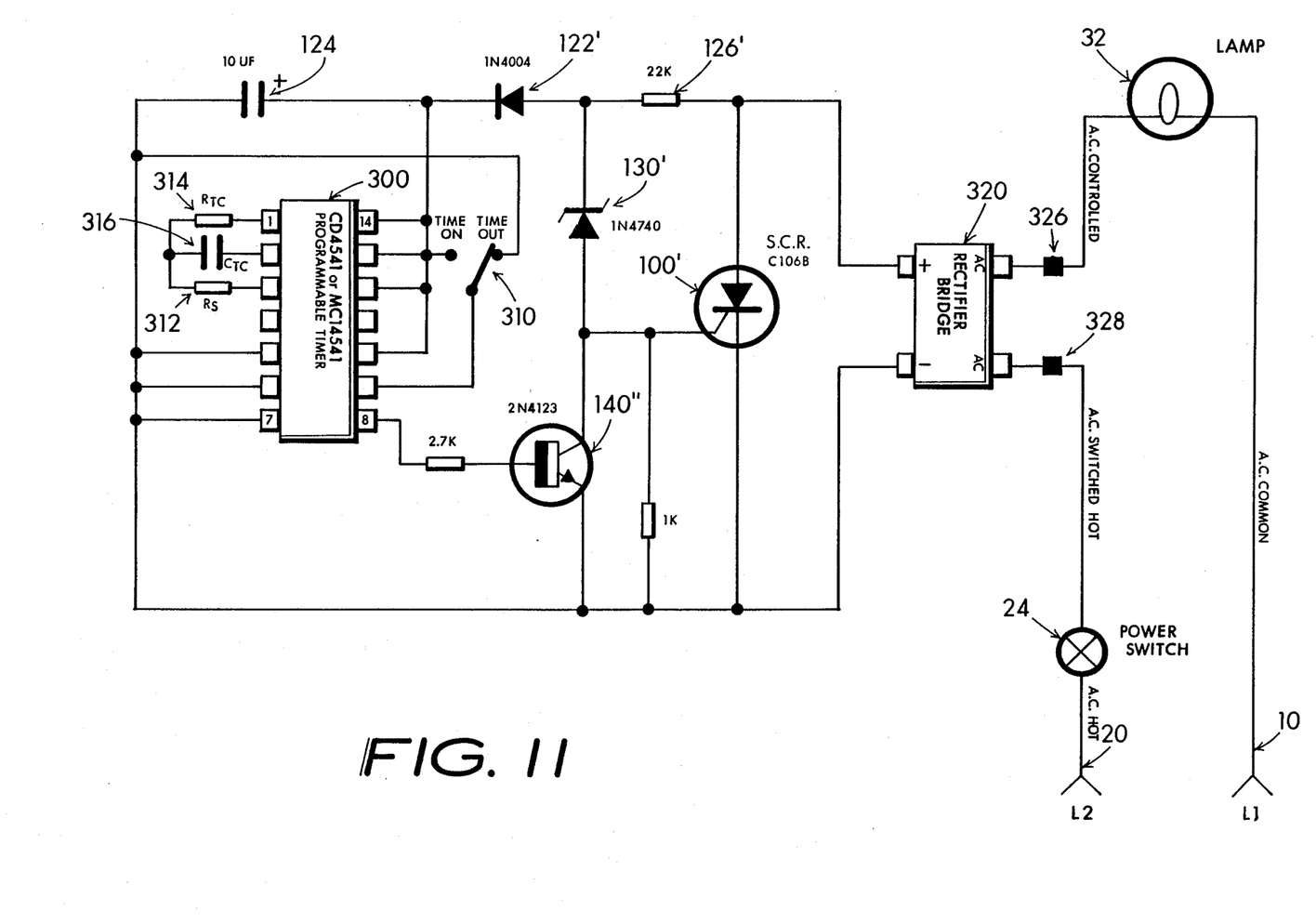
FIG. 11 Electric light timer, suitable for use like a wall switch replacement, which is adaptable to provide either delayed turn-ON or else delayed automatic turn-OFF of a light some time after circuit power is applied.

The turn-ON of the power switch 24 in the circuit of FIG. 11 couples the 60-hertz (or 50-hertz) a.c. power with the "AC" terminals 326, 328 with a bridge rectifier, like a Varo Semiconductor Corp. type VM-28 or Mouser Electronics Corp. type 33RS203. In this hookup, "shorting" of the + and − output-side terminals of the bridge will serve to turn the lamp 32 ON, because the "short" is coupled through the bridge effectively presenting a low impedance between its AC (e.g., inupt) terminals. A programmable timer 300 represented as a Motorola MC14541 or the like provides an output from pin 8 that connects with the base of NPN transistor 140". The overall circuit action is such that when pin 8 is LOW, the transistor 140" is OFF, and 120 hertz (100 hertz) a.c. power pulses coupled across thyristor 100 from bridge 320 also couple through resistor 126' and zener diode 130' to the gate of the thyristor 100', which might be a General Electric type C106B silicon controlled rectifier. The result is turn-ON of the s.c.r. subsequent to the peak a.c. voltage level having risen sufficiently to overcome the breakdown voltage of the zener diode 130'. The turned-ON thyristor appears like a "short" across the diode bridge 320, and the lamp 32 is turned ON. When the Q output from pin 8 of the timer 300 alternatively rises HIGH, the transistor 140" is turned ON, effectively drawing the juncture between the thyristor gate and the zener diode 130' LOW by way of the saturation of the transistor collector-to-emitter connection with the thyristor cathode. The result is the gate is starved for current and the thyristor turns OFF, thus acting to "open" the connection across the bridge 320 and disconnecting the lamp circuit from the a.c. supply line L2. Relatively low frequency timing pulses are produced by the internal oscillator of the timer 300, with the frequency essentially determined by the resistors 312, 314 in concert with the capacitor 316. Alternatively, the 120 hertz (100 hertz) frequency component appearing across the thyristor 100' could be utilized by merely connecting pin 3 of the timer through a 150 kilohm resistor with the anode of the thyristor. The time period would be limited to about 9.1 (10.9) minutes, as determined by the 120 hertz (100 hertz) frequency pulses and the intrinsic divide-by-65,536 characteristic of the timer. Thus, for longer timer periods, the use of the internal oscillator running at a lesser frequency is necessary. The oscillator frequency needed to obtain any desired time period $T_{min}$ may be quickly determined from:

$$F_{CK} = 65,536 / T_{min} \times 60 = \text{hertz.}$$

It is noteworthy that I teach this particular configuration to provide either delay-before-ON or delay-before-OFF operation, depending upon the predetermination of selector 310. The selector might be a switch, or the equivalent such as merely jumpers on a printed circuit board.

Figure 12:
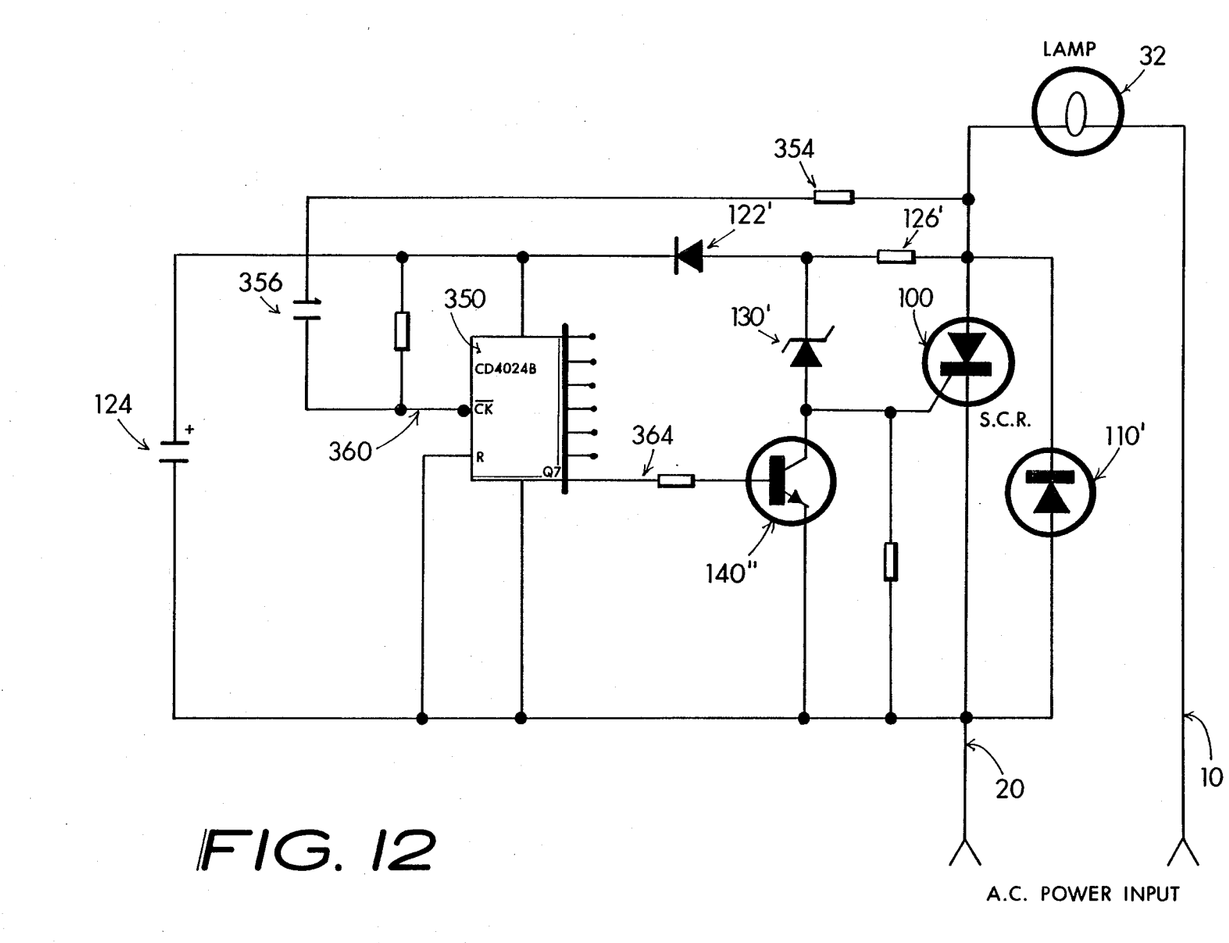
FIG. 12 Electric light flasher, providing BRIGHT/DIM flashing of a light bulb and requiring connection with only one side of the a.c. power circuit.

A flashing of the lamp 32 is produced in the circuit of FIG. 12, between that of a FULL-bright and HALF-bright level by the alternate turn-ON and turn-OFF of the s.c.r. 100 as controlled by the NPN transistor 140". The operation of the s.c.r. is similar to that described for FIG. 4. A 7-stage counter 350 is successively clocked with a signal developed on line 360 which is derived from the a.c. line frequency through resistor 354 and capacitor 356. The Q7 output states from the counter on line 364 switch alternately HIGH and LOW with a period of slightly over 1 second in each state. This of course brings about alernating ON and OFF conduction through the transistor 140", producig periodic ON and OFF switching of the load by the s.c.r.: e.g., the lamp 32 repeatedly "blinks" BRIGHT and DIM, since essentially half of the a.c. power still feeds the lamp through diode 110' even when the s.c.r. 100 is OFF.

Figure 13:
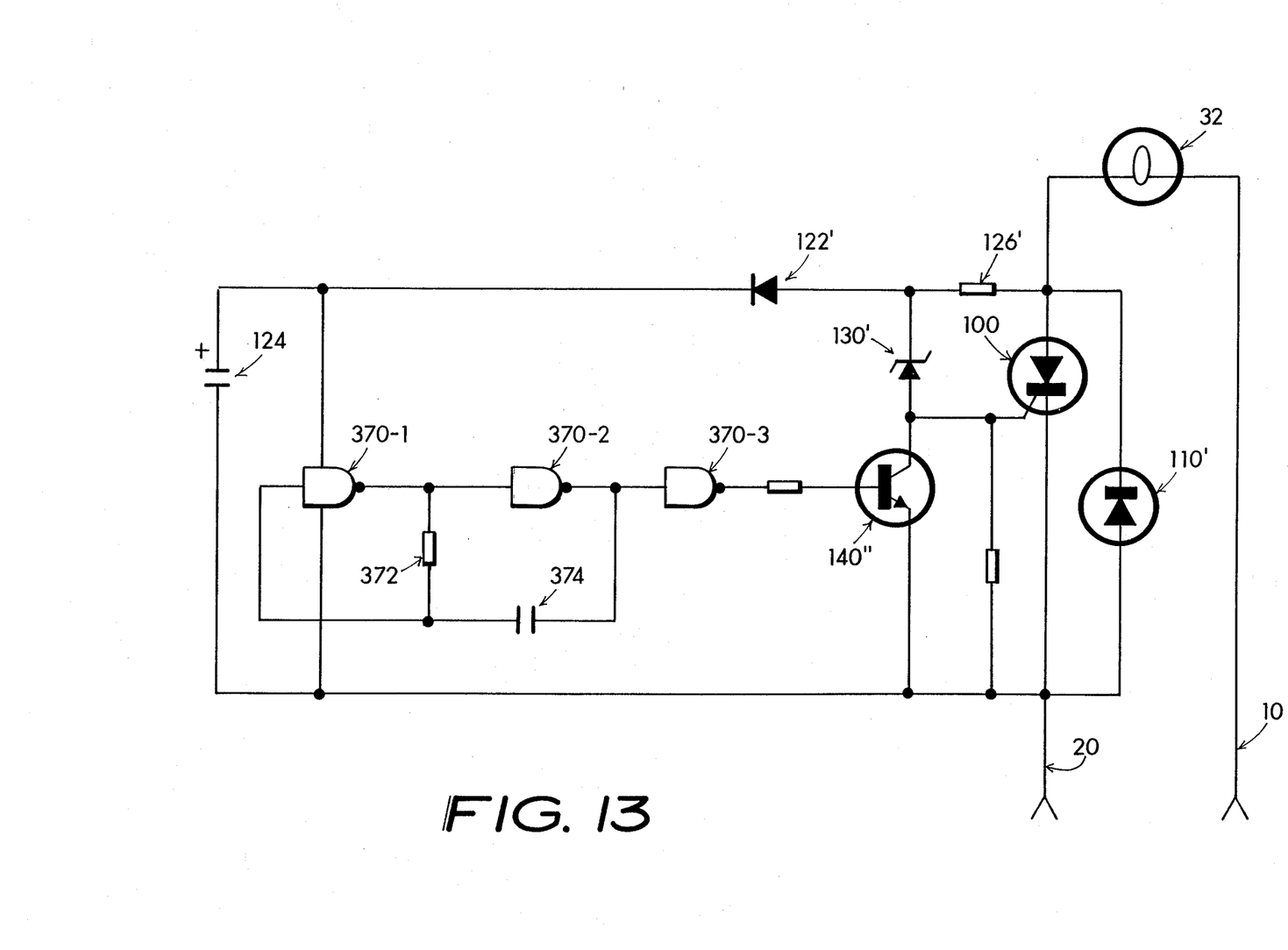
FIG. 13 Electric light flasher, providing BRIGHT/DIM flashing of a light bulb and requiring connection with only one side of the a.c. power circuit.

A different arrangement for a lamp 32 flasher is shown in FIG. 13. Employing the essential elements taught relative with FIG. 4, I produce periodic ON and OFF control of the base of the transistor 140" by utilizing a periodic pulse train produced by the NAND gates 370-1, 370-2 which together with the resistor 372 and capacitor 374 make up a multi-vibrator. The pulses couple through the NAND gate 370-3 which operates an an inverter, delivering alternating pules to the base of the transistor 140". Agian, the result is BRIGHT and DIM blinking of the lamp 32.

Figure 14:
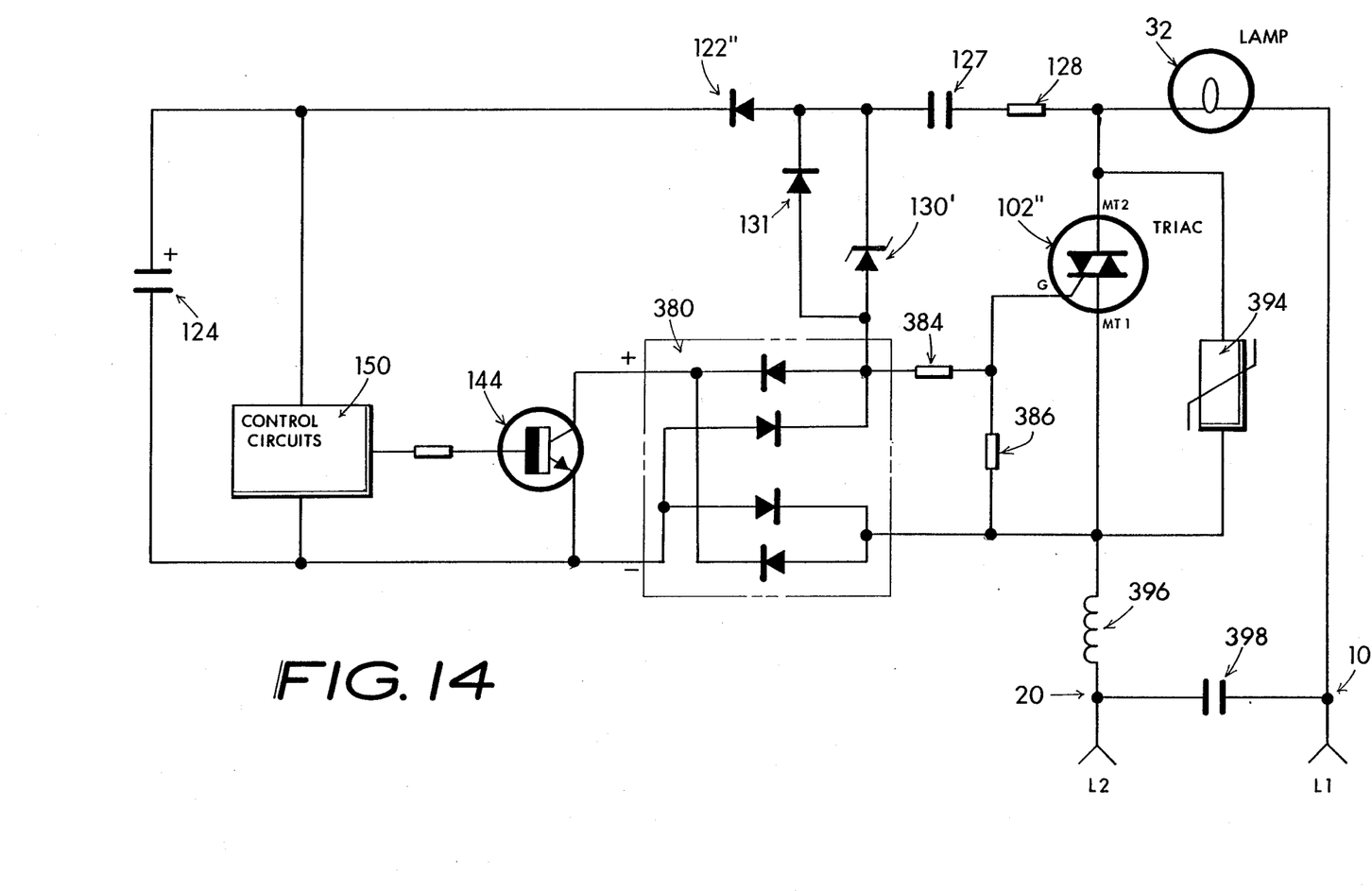
FIG. 14 Full-wave a.c. power ON/OFF control shown to be obtained from a low-voltage unilateral switching device, such as a transistor, through a diode bridge.

In FIG. 14 I show the full-wave turn-OFF control of an ordinary triac 102" through switching the juncture of the zener 130' with the resistor 384 LOW through the effective "shorting" of the output side of a diode bridge 380 by collector saturation of an NPN transistor 144 brought about by signals coupled to it from the control circuits 150. The resistor 384, together with resistor 386 act as a voltage divider to overcome the intrinsic diode drops through the bridge 380. By using a diode bridge, I have now provided bilateral control of the triac gate circuit with the unilateral control characteristics of the transistor circuit saturation.

A varistor 394, such as a Siemens type S14K150 is connected across the triac to help prevent damage by power-line transient voltage spikes. A choke coil 396, together with a capacitor 398 act as a r.f. filter to help reduce noise produced by the triac switching from radiating out onto the power line.

Figure 15:
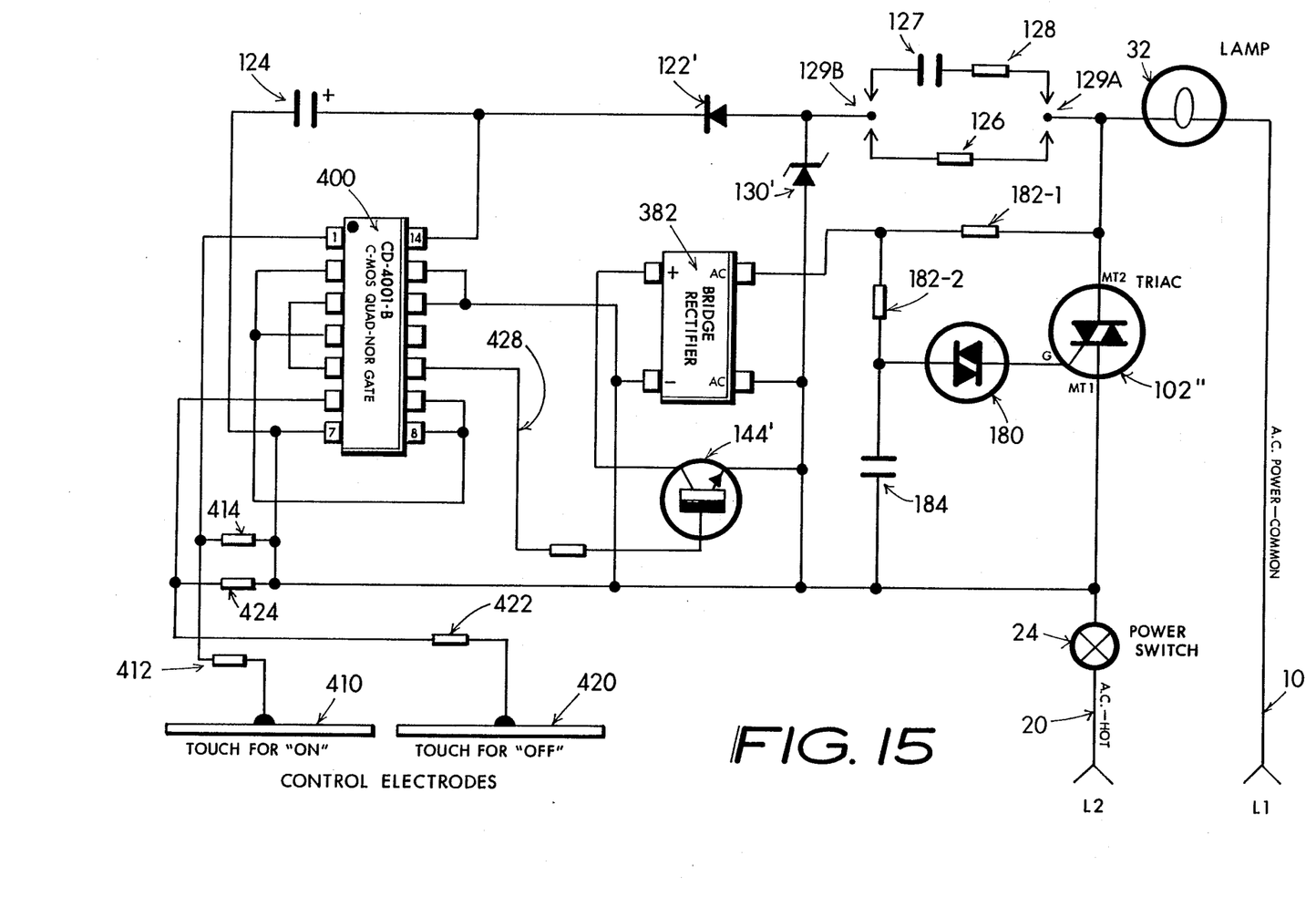
FIG. 15 Touch operated electric light switch which is suitable for wall-switch replacement, requiring connection with only one side of the a.c power circuit.

The triac 102" in FIG. 15 is turned-ON, when the transistor 144 is OFF, by the dynamic breakover action of a diac 180 such as a Teccor type HT-32, which delivers the charge from capacitor 184 as a triac gate drive pulse. The capacitor is fed charging current through resistors 182-1,182-2. When the transistor 144' is saturated, the d.c. (commonly known as the output) side of the bridge 382 is shunted, thus pulling the conjoined resistors 182-1,182-2 to near the MT-1 level of the triac, spoiling any current flow to and resultant charge accumulation in capacitor 184. Thus, the triac can not obtain gate current through the diac and, being thusly starved for gate current, does not turn ON. With the combination I show, ON state operation of the triac results in somewhat more than about 30 peak a.c. volts impressed across the triac just prior to its turn-ON due to the intrinsic breakover voltage rating of the diac, while when the triac is OFF essentially full a.c. line voltage appears across the triac terminals. This portion of the circuits operation borrows from the teaching of my earlier 4,300,090 patent in that the diac behaves as a voltage responsive device which induces an ON state of low impedance across the thyristor whenever the a.c. magnitude reaches a predetermined value which is in the practical sense, the intrinsic break-over voltage of the diac. Like my -090 patent shows, a d.c. charge is delivered to the capacitor 124 through the rectifier 122'. Since the natural breakover of the diac is excessive, I utilize a zener diode 130' to level the charge which might otherwise accumulate across the capacitor 124 to a lesser value, by producing a voltage drop across resistor 126'. The quad-NOR C-MOS gate 400 is utilized as a bi-stable element (flip-flop) characterized as having a very high "set" and "reset" terminal input impedance. An input to one of the flip-flop stages (pin 1) couples with a "touch for ON" control electrode 410, whilst the input of the other stage (pin 6) couples with a "touch for OFF" control electrode 420. High value resistors 412,422 (e.g., typically about 2.2 megohms) connect in series with each control electrode for the purpose of safe electrode isolation from the line-voltage potential which may otherwise be present in the controller circuitry. Mere "touching" of the metal control electrode 410 induces a sufficiently high "static charge" level into pin 1 of the NOR gate 400, thus setting the states such that the output from pin 10 is LOW. Conversely, merely "touching" of the other metal control electrode 420 brings about opposite setting of the flip-flop stage due to the presence of "static charge" induced thereinto. My definition of "static charge" in this application means any combination of static potential, hum, and other electrical noise which combine to upset the equilibrium of the respective NOR gate to an extent sufficient to even briefly change its state, whereupon usual flip-flop action occurs. The pull-down resistos 414,424 are also of a relatively high value, having about the same resistance as that of the resistors 412,422. The important essence of this circuit is that it obtains all operating power from one side of the load circuit, therefore making installation more simple. I also show that the hookup may include either the combination of an impeder 127 and resistor 128, or else just a resistor 126 connected with the terminal points 129A,129B to provide the necessitous current limiting for the zener diode 130' operation.

Figure 16:
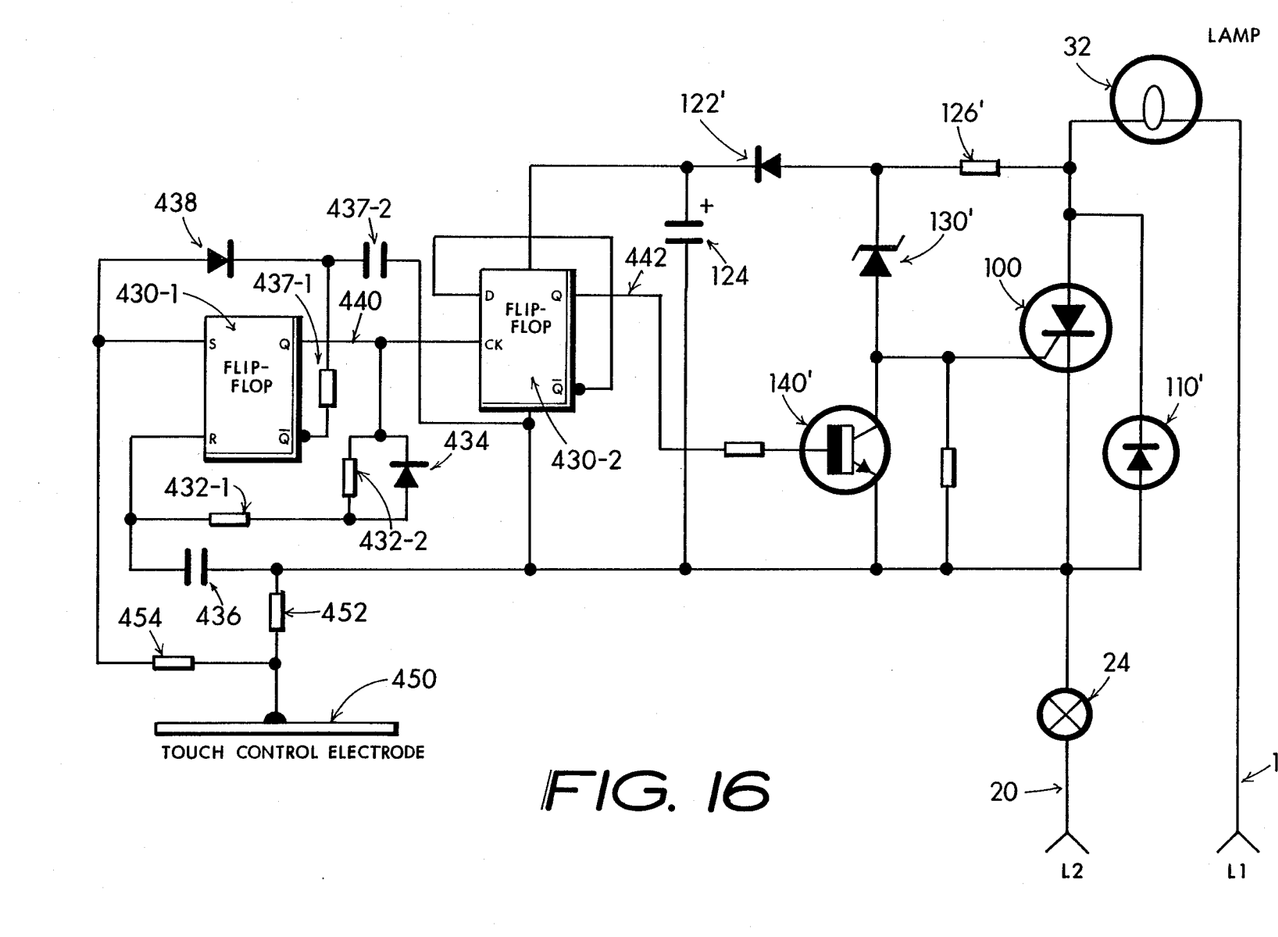
FIG. 16 Electric light switch which is alternatively turned-BRIGHT or -DIM by merely touching a common electrode, being suitable for wall-switch replacement by needing connection with only one side of the a.c. power circuit.

Bright and dim control of a room light can be provided by the version of my controller shown in FIG. 16. A touch control electrode 450 is arranged to be "touchable" by a person operating a wall switch or the like, which may include the mechanical switch 24. When the electrode 450 is touched, "hand capacity" which may include static electricity and other electrical noise (hum, etc.) is developed across resistor 452, and coupled to the SET input of a flip-flop 430-1 through a high value resistor 454. With resistor values on the order of several megohms, negligible current flow occurs through the contact electrode, resulting in safe finger contact by a person. The setting of the flip-flop Q output line 440 HIGH then occurs, which serves to "clock" the CK input of the second flip-flop 430-2 which is hooked-up like a "divide-by-two" counter, with the consequence that the Q output line 442 will reverse its state (i.e., HIGH to LOW, or LOW to HIGH). Thus, each time the contact electrode 450 is touched, the state of line 442 will change. The flip-flop 430-2 Q output then couples with the base of the NPN transistor 140', which together with the thyristor 100 and other parts operates to switch the a.c. load 32 in a manner as described for FIG. 4. The resistors 432-1, 432-2 together with the capacitor 436 act to reset the flip-flop after a brief time period (as determined by the R/C time constant of the components). When line 440 goes HIGH, the capacitor 436 charges through the resistors 432-1, 432-2 until the reset input R of the flip-flop rises sufficiently to RESET the flip-flop, whereupon the line 440 will again go LOW. Capacitor 436 is then quickly discharged LOW through the lower value resistor 432-1 and diode 434. Diode 438 serves to pull the S input LOW the instant setting of the flip-flop 430-1 has been obtained. The result of overall circuit operation is that repeated "touching" of the control electrode 450 serves to alternatively change the brightness of the lamp 32 BRIGHT and DIM, while the mechanical switch 24 provides ON and OFF operation.

Although I have taught my invention by utilizing certain specific arrangements of parts, it is realized that any person skilled in the art could hook-together other equally effective arrangements of parts while not departing from the essence and obvious substance of my invention's improvement in its method of operation, and in the illustrated details of apparatus intended to obtain such improved operation.

What I claim is:

1. Method of switching alternating current (a.c.) power flow through and supplying direct current (d.c.) power from one side of an a.c. power circuit, comprising the steps of:
   a. providing gate enabled thyristor controlled switching of a.c. power flow through the circuit;
   b. enabling the thyristor into an ON state by admitting gate current thereinto when the instantaneous voltage across the thyristor exceeds a predetermined level; and
   c. maintaining the thyristor in an OFF state by shunting the gate current away from the thyristor gate;

d. producing a source of d.c. power derived from a.c. energy which appears across the thyristor in each the ON and OFF state thereof.

2. Method of claim 1 comprising the further steps of:
   a. providing the thyristor controlled switching to occur between a source of a.c. power and a load;
   b. providing commutation of the thyristor to an OFF state following each instant portion of successive a.c. power cycle periods when negligible current flows therethrough;
   c. producing the gate current subsequent to any peak a.c. voltage which may appear across the thyristor having exceeded a predetermined level;
   d. diverting the produced gate current away from the thyristor gate when the thyristor operating state is wanted to be maintained OFF and furthermore effective to cease diversion of the gate current when the thyristor operating state is wanted to be turned on;
   e. rectifying and filtering at least a portion of the peak a.c. voltage appearing across the thyristor as a source for d.c. power; and,
   f. utilizing the d.c. power for ancillary circuit operation.

3. Method of claim 1 comprising the further steps of:
   a. producing a state of nearly full-cycle a.c. power conduction through the a.c. power circuit when the thyristor is turned ON; and,
   b. producing a state of about half-cycle a.c. power conduction through the a.c. power circuit when the thyristor is maintained OFF.

4. Method of claim 1 comprising the further steps of:
   a. interrupting a.c. current flow admitted through the a.c. power circuit by the thyristor for at least a small portion of one-half of each successive a.c. power cycle prior to thyristor enablement to the ON state;
   b. providing that at least a relatively small portion of a.c. energy may consequentially appear across the thyristor;
   c. rectifying a portion of the a.c. energy appearing across the thyristor to produce d.c. power; and,
   d. utilizing the d.c. power for ancillary circuit operation.

5. Method of claim 4 comprising the further steps of:
   a. providing a threshold voltage responsive device coupled with the a.c. energy appearing across the thyristor;
   b. producing negligible current flow through the responsive device when the instantaneous voltage level of the a.c. energy appearing across the thyristor is effectively below a predetermined threshold voltage level for the responsive device;
   c. producing an increase of current flow through the responsive device when the instant voltage appearing across the thyristor exceeds the threshold voltage of the responsive device; and,
   d. adapting the increased current flow through the responsive device to turn the thyristor ON and thereby establish substantial current flow through the a.c. power circuit for any remaining half-cycle portion of any acted upon a.c. power cycle.

6. Method of claim 5 comprising the further steps of:
   a. maintaining OFF control of the thyristor by reducing the effect of any current flow obtained through the voltage responsive device as may otherwise be adapted to turn the thyristor ON to a value insufficient to produce thyristor turn-ON; and,
   b. enabling turn-ON control of the thyristor by allowing the effect of any current flow obtained through the voltage responsive device to be adapted to turn the thyristor ON.

7. Method of claim 6 comprising the further steps of:
   a. limiting a large value of a.c. energy which appears across the OFF maintained thyristor to a lesser value by a current limiting element coupled effectively in series with the current flow established through the voltage responsive device;
   b. predetermining any voltage drop produced across the current limiting element to be sufficient to limit the a.c. level obtained therefrom to a lesser value adequate for rectification as the source of d.c. power.

8. Electric alternating current (a.c.) power control and direct current (d.c.) power supply means comprising:
   a. source of alternating current electric power;
   b. a.c. load;
   c. thyristor means having a first power terminal including a gate associated therewith, and a second power terminal, whereby said power terminals are coupled effectively in series with at least said a.c. load and said source of electric power, producing a switchable conductive path therebetween;
   d. voltage responsive means and current limiting means effectively coupled in series between said gate and said second power terminal, whereby when any voltage appearing across the voltage responsive means is below a predetermined threshold level no substantial gate current is admitted to the gate of the thyristor means and the thyristor means is maintained non-conductive and essentially OFF, whilst the moment said voltage appearing across the voltage responsive means exceeds the predetermined threshold level gate current is admitted to the means to initiate conduction through the thyristor means and essentially turn-ON the a.c. load for at least the remainder of the instant a.c. power half-cycle;
   e. gate current diverting means coupled between the gate and the first power terminal of the thyristor means and having a control input thereto, whereby when a first control signal value is coupled with the diverting means any substantial gate current which may otherwise be admitted to the gate by way of the voltage responsive means is shunted effectively to the first power terminal instead; and when a second control signal value is coupled with the diverting means any gate current which may be admitted to the gate by way of the voltage responsive means is thusly admitted;
   f. rectifier means and capacitor means coupled effectively in series with said current limiting means and said first and second power terminals and effectively in parallel with the said voltage responsive means, thereby producing a relatively low voltage d.c. power value substantially across the capacitor means through rectification of at least a portion of the a.c. power appearing across said first and second power terminals in each the ON and OFF state thereof; and,
   g. d.c. load coupled to the capacitor means to obtain d.c. power therefrom in each the ON state and OFF state operation of the control means.

9. Control and power supply means of claim 8 wherein said thyristor means further comprises a silicon controlled rectifier coupled inverse-parallel with a power diode (e.g., s.c.r. anode to diode cathode, s.c.r. cathode to diode anode), whereby when the s.c.r. is ON alternating half-cycle a.c. electric power is coupled with the a.c. load, whereby further when the s.c.r. is OFF every-other half-cycle a.c. power is coupled with the a.c. load.

10. Control and power supply means of claim 8 wherein said voltage responsive means comprises an avalanche diode, e.g. such as a zener diode; and wherein further said current limiting means provides a substantial value of effective a.c. resistance to reduce the maximum circuit current when the thyristor means is OFF and the a.c. power voltage impressed between the first and second power terminals thereof reaches a maximum value.

11. Control and power supply means of claim 8 further comprising pseudorandom pulse signal source coupled with the control input of the diverting means, effective to produce irregular ON and OFF control of the thyristor means, thus bringing about inconstant power flow between the power source and the a.c. load.

12. Control and power supply means of claim 8 further comprising timing signal source means coupled to said control input of the diverting means, effective to produce a delayed change in the relative ON and OFF states of the thyristor means subsequent to application of a.c. power to the series combination of the a.c. load and the thyristor means.

13. Control and power supply means of claim 8 further comprising periodic signal source means coupled to said control input of the diverting means, effective to produce a regular alernation of a period of thyristor means ON states with a period of thyristor means OFF states.

14. Control and power supply means of claim 8 further comprising "touch" responsive sensor signal producing means coupled to said control input of the diverting means, effective to produce the turn-ON of the thyristor means when a first contact receptor is touched and the turn-OFF of the thyristor means when a second contact receptor is touched.

15. Control and power supply means of claim 8 further comprising "touch" responsive sensor signal producing means coupled to said control input of the diverting means, effective to produce the turn-ON of the thyristor means when a contact receptor is firstly touched, followed by the turn-OFF of the thyristor switch means when the contact receptor is nextly touched, with ON and OFF operation following in alternation with repeated touching of the contact receptor.

16. Electric alternating current (a.c.) power control and direct current (d.c.) power supply means comprising:
   a. source of alernating current electric power;
   b. a.c. load;
   c. thyristor switch means having first and second power terminals coupled between the source and the a.c. load, furthermore having gate effective for accepting gate current to enable turn-ON of the thyristor means thereby permitting substantial power conduction between the first and second power terminals;
   d. voltage responsive means coupled between the second power terminal and the gate, effective to admit substantial current into the gate when the peak voltage appearing effectively between the power terminals of the thyristor means exceeds a predetermined value;
   e. switchable diverting means coupled between the gate and the first power terminal and having at least two switchable states, whereby in a first state the substantial current is mostly admitted into the gate thereby enabling turn-ON of the thyristor, and in a second state the substantial current is mostly diverted directly to the first power terminal portion of the thyristor means thereby starving the gate for current thusly maintaining the thyristor means in an OFF state;
   f. power conversion means coupled between the power terminals and effective for adapting a portion of any a.c. energy appearing between the power terminals in each the OFF and the ON state thereof into a source of relatively low voltage d.c. power;
   g. control circuit means coupled to the switchable diverting means and effective therewith to produce selective control of the first state and the second state thereof; and,
   h. d.c. load coupled to the low voltage d.c. power source.

17. Control and power supply means of claim 16 wherein said voltage responsive means comprises a resistor having one terminal thereof coupled with the second power terminal and the other terminal thereof coupled with a first terminal of a capacitor means that has a second terminal thereof coupled with the first power terminal whereby the capacitor means is charged by current flow through the resistor produced by electric energy appearing effectively between the OFF state power terminals, and further one lead of a breakdown diode means such as a diac is coupled to a juncture including the resistor means second terminal and the capacitor means first terminal and the other lead coupled to the gate of the thyristor means and operates as a voltage responsive means which produces a discharge of some of the energy stored in the capacitor means as current into the gate when the voltage responsive means predetermined value is exceeded, thereby effecting turn-ON of the thyristor means; and the switchable diverting means comprises a semiconductor switch means coupled substantially between the juncture and the first power terminal, whereby when the diverting means is enabled current flow through the resistor is diverted to the first power terminal thereby retarding the charge accumulation in the capacitor means below the level necessary to bring about breakdown diode response, and when the diverting means is disabled the capacitor means quickly accumulates charge through the resistor producing turn-ON of the thyristor means when the instant voltage across the first and second power terminals somewhat exceeds the breakdown diode breakover voltage rating.

18. Control and power supply means of claim 16 wherein said diverting means comprises a transistor having a collector and emitter portion thereof effectively coupled between the gate of the thyristor means and first power terminals thereby bringing about the ON and OFF control of substantial diversion of alternate half-cycle a.c. current flow in the gate; and whereby furthermore a diode bridge means may be interposed between the transistor and the thyristor means having its usual two d.c. terminals effectively coupled between the transistor collector and emitter portion; whilst its usual two a.c. terminals are coupled between the gate and first power terminal to bring about effective ON and OFF control of substantial diversion of full-cycle a.c. current flow in the gate.

19. Control and power supply means of claim 16 wherein said control circuit means comprises a source of pseudorandom pulse signal that, conjoined by the diverting means and the gate, brings about irregular ON and OFF switching of the thyristor switch means thereby producing an inconstant power flow to the a.c. load and, furthermore where the a.c. load coupled therewith may be an electric lamp with the light produced thereby having an inconstant appearance of flickering like that produced by a natural flame.

20. Control and power supply means of claim 16 wherein said control circuit means comprises a source of timed signal having a first value followed subsequently, and usually on thr order of a few minutes or more later, by a second value signal; whereby when conjoined by the diverting means and the gate brings about a controlled switching of the thyristor switch means which results in producing a first level of a.c. power flow through the a.c. load timely followed by a second level of a.c. power flow therethrough, whereby one of the said levels of a.c. power flow is less than the other.

* * * * *